Sept. 20, 1932.    C. O. AKERLUND    1,877,781
HANGER
Filed Feb. 13, 1931    2 Sheets-Sheet 1
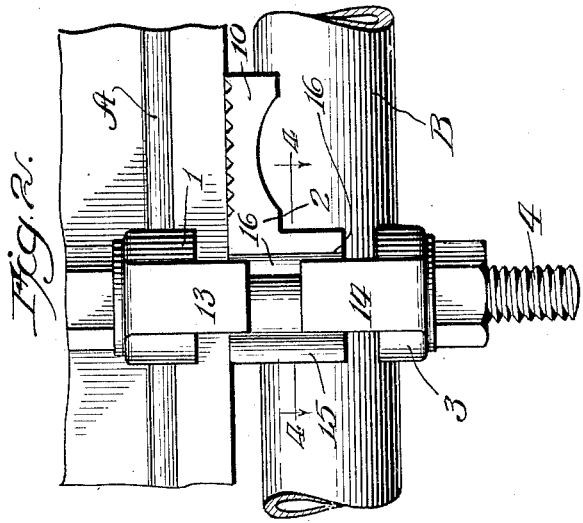
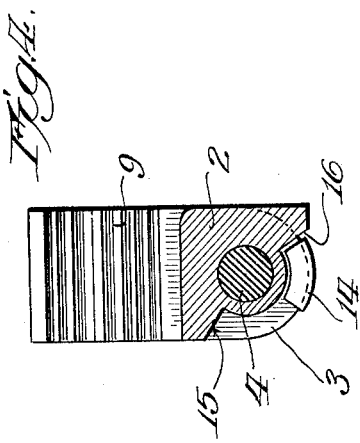
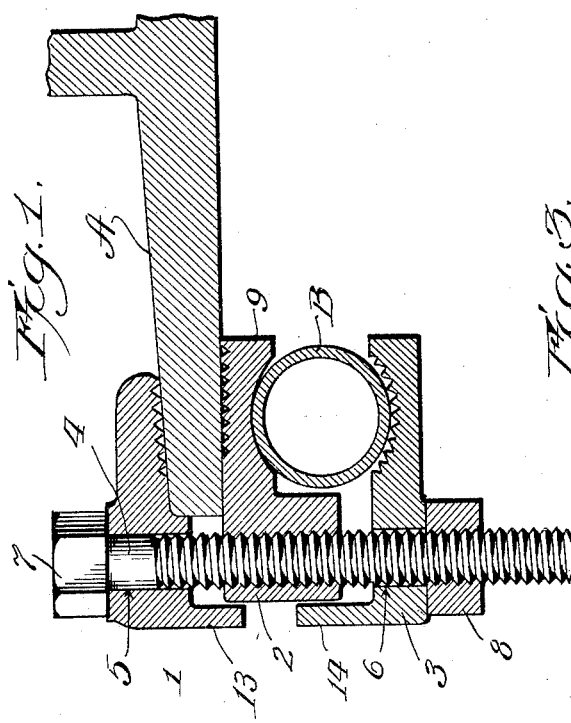
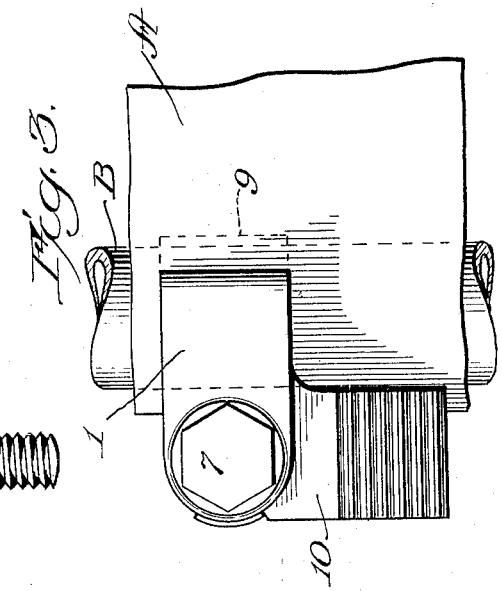
Inventor
Carl O. Akerlund,
by Wm. F. Freudenreich,
Att'y.

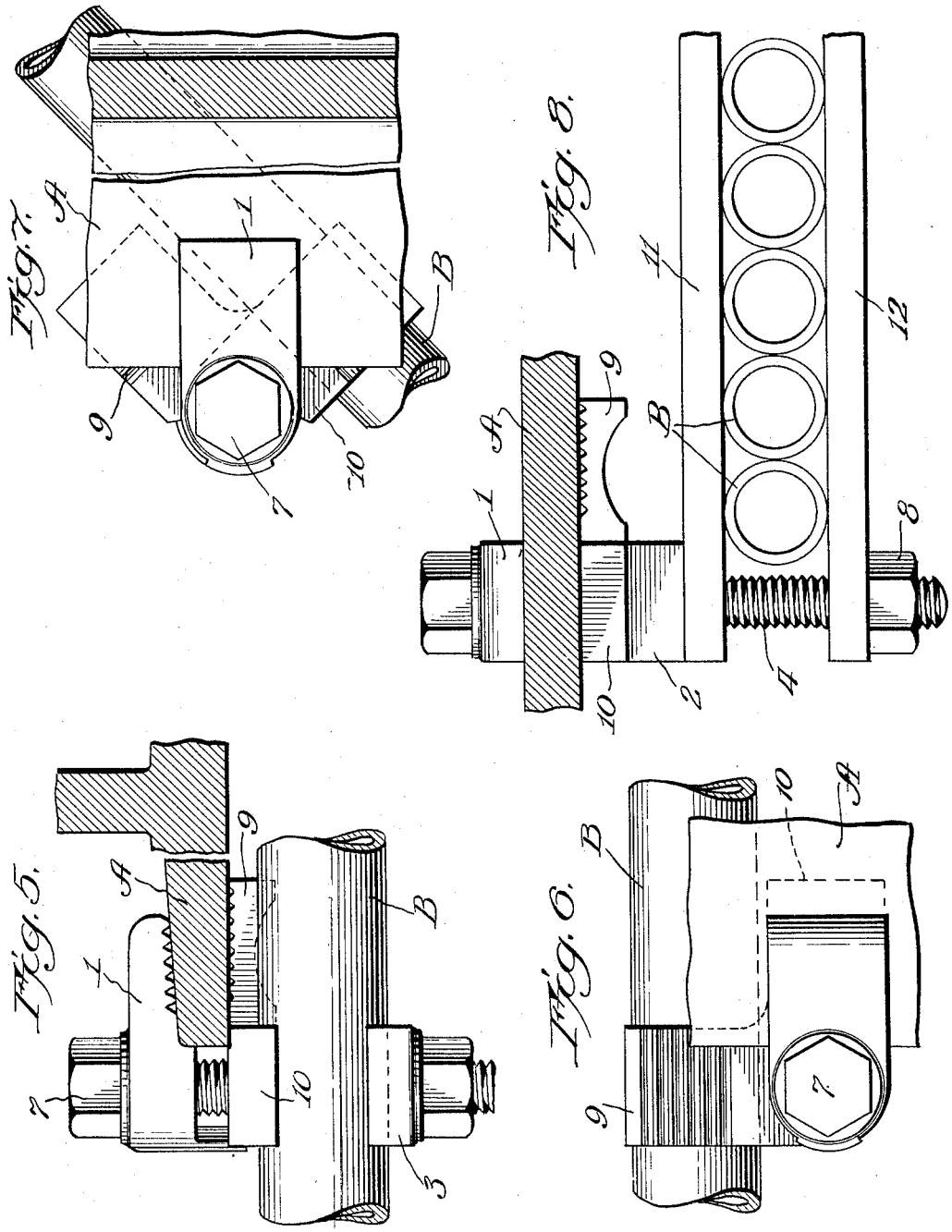

Patented Sept. 20, 1932

1,877,781

UNITED STATES PATENT OFFICE

CARL O. AKERLUND, OF CHICAGO, ILLINOIS, ASSIGNOR TO APPLETON ELECTRIC COMPANY, A CORPORATION OF ILLINOIS

HANGER

Application filed February 13, 1931. Serial No. 515,463.

The present invention has for its object to produce a hanger for pipes or the like which shall not only be simple and novel in construction, but can readily be operated or manipulated to engage it with a support and with a pipe or pipes.

In carrying out my invention, I employ a pair of clamping jaws between which the flange of a structural steel beam or the like may be firmly gripped, a third jaw cooperating with one of these jaws to clamp the pipe or other member or members to be supported, and there being a single bolt or similar fastening which, however, permits the pipe to be clamped in place or removed without disturbing the connection between the hanger as a whole and the beam or other support.

A pipe to be hung may stand parallel to, or at a right or other angle to a beam from which it is to be supported. Viewed in one of its aspects, my invention may be said to have for its object to produce a simple and novel hanger whereby a pipe may effectively be hung from a beam or the like, regardless as to whether it be parallel or at an angle to the latter.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a section through one of my improved devices supporting a pipe from and parallel to a beam, on a plane at right angles to the pipe and beam; Fig. 2 is an elevation, looking at the left-hand side of the structure as it appears in Fig. 1; Fig. 3 is a top plan view; Fig. 4 is a section on line 4—4 of Fig. 2; Fig. 5 is an elevation, a fragment of the beam being in section, of the device supporting a pipe at right angles to the beam; Figs. 6 and 7 are top plan views of the device supporting the pipe in still other positions, fragments of the beam being also shown; and Fig. 8 is an elevation of the device provided with attachments to support a plurality of pipes, a fragment of a supporting beam being shown.

Referring to the drawings, which illustrate only a single preferred embodiment of my invention, 1, 3 and 2 are three separate clamping jaws of which the first two lie, respectively, above and below the intermediate jaw 2. The jaw 2 is so designed that it cooperates with both of the other jaws to produce two clamps, one of which serves to secure the hanger to the flange A of an I-beam, for example, whereas the other engages and holds a pipe B or the like. There is a single fastening in common to the three jaws, this fastening being of such a nature that a pipe may be attached or detached without disturbing the connection of the hanger to the beam. In the arrangement shown, this fastening device consists of a bolt 4 screw-threaded into the intermediate jaw and extending freely through unthreaded holes 5 and 6 in the upper and lower jaws. Therefore, the upper and lower jaws are loose on the bolt and can turn freely thereon or move freely lengthwise of the bolt. On the upper end of the bolt is a head 7 and on the lower end a nut 8.

To attach the hanger to the beam, the bolt is turned to separate the two upper jaws, the hanger is slipped on the beam with the flange A entered between the two upper jaws, and then the bolt is turned until the jaws close tightly on the flange. Then, to connect the pipe, the lower jaw is slipped on the bolt and the nut is applied, the nut being screwed on only far enough to hold up the lower jaw. The pipe is then placed between the lower and intermediate jaws and the nut is turned until the pipe is firmly gripped between the lower and the intermediate jaws. If it be desired to detach the pipe, this may be done by unscrewing the nut and without disturbing the grip of the hanger on the flange of the supporting beam.

In order to permit the pipe to lie in various positions with respect to the beam, I make the intermediate jaw a multiple jaw consisting of two arms 9 and 10 extending radially of the bolt, in the same plane, and lying at right angles to each other. Either of the two arms may be employed as the intermediate jaw or, in some cases, both arms. In Figs. 1–4, the arm 9 is acting as the intermediate jaw, the flange A being clamped between the same and the upper jaw 1, and the pipe B, lying below and parallel to the beam, being clamped between the arm 9 and the lower jaw. In Fig. 5, the arm 9 and the upper jaw constitute a clamp gripping the beam, and the arm 10 and the lower jaw engage and hold the pipe which lies at right angles to the beam. In Fig. 6, there is illustrated a condition similar to that existing in Fig. 5, excepting that the arm 10 and the upper jaw form one clamp and the arm 9 and the lower jaw the other. In Fig. 7, the intermediate jaw is so positioned that its arms make angles of forty-five degrees with the edge of the beam, the upper jaw bisects the angle between the arms, and the lower jaw underlies the arm 10 and cooperates with the latter to support the pipe at an angle of forty-five degrees to the beam. In this instance, both arms of the intermediate jaw are part of the upper clamp, and only one arm forms part of the lower clamp.

In Fig. 8, I have shown a modified arrangement for supporting many pipes, requiring the use of two hangers. In this arrangement, the lower jaw member 3 of each hanger is omitted, and, in its stead, are two long bars 11 and 12 through one end of each of which the bolt passes loosely. The upper bar 11 is engaged with the under side of the intermediate jaw 2, and a plurality of pipes are disposed between the upper bar and the lower bar 12; the bar 12 being engaged by the nuts 8. The two hangers, one at each end of the bars 11 and 12 (only one being shown), are attached to supporting beams in the manner heretofore explained, and the pipes may be placed in position or removed by simply tightening or loosening the nuts, or, at most, by first removing the bar 12.

Since my improved hanger will ordinarily be employed under one of the conditions illustrated in the first six figures of the drawings, I have provided means whereby the intermediate and lower jaws may quickly and accurately be brought to any one of these positions. To this end I have provided the upper and lower jaws with lugs 13 and 14, respectively, which extend toward each other on the side of the bolt opposite that on which body portions of the jaws lie. These lugs are long enough so that in ordinary use each will overlap the intermediate jaw somewhat. The intermediate jaw has thereon shoulders 15 and 16 extending parallel with the long axis of the bolt on opposite sides of the lugs. The angular distance between the shoulders 15 and 16 is such that each of the lugs 13 and 14 has a play of approximately ninety degrees, relatively to the intermediate jaw. Furthermore, the parts are so proportioned that, when one of the lugs engages with the shoulder 16, for example, the corresponding jaw registers with the arm 9 of the intermediate jaw; whereas, when the lug is in engagement with the shoulder 15, the corresponding jaw registers with the arm 10 of the intermediate jaw. In other words, after the hanger has been slipped on the supporting beam, and the upper jaw has been placed in the desired position with respect to the latter, the intermediate jaw is simply turned toward the right or the left until its movement is arrested through engagement with the lug 13, bringing the proper arm underneath the upper jaw. The bolt is then turned so as to cause the upper and intermediate jaws to close on the flange of the beam. Then the lower jaw is swung in a proper direction until arrested by one of the stop shoulders on the intermediate jaw, placing the lower jaw under the proper arm of the intermediate jaw. In this way, the workman has no difficulty in placing the various jaw elements in the proper positions, and the work of installation is greatly simplified.

While I have illustrated and described with particularity only a single preferred embodiment of my invention, together with a slight modification, I do not desire to be limited to the exact structural details thus illustrated and described; but intend to cover all forms and arrangements which come within the definitions of my invention constituting the appended claims.

I claim:

1. A hanger comprising three jaws, a bolt screw-threaded into the intermediate jaw and passing freely through openings in the other two jaws, said bolt having on one end a head and on the other end a nut, the intermediate jaw being composed of two arms radial with respect to the bolt and arranged at an angle to each other.

2. A hanger comprising two jaws, a third jaw intermediate between and cooperating with each of the first two jaws, a bolt passing through the jaws to draw them together, one of the jaws being screwed on the bolt and the other two jaws being loose on the bolt, the intermediate jaw being composed of two arms radial to the bolt and arranged at an angle to each other.

3. A hanger comprising two jaws, a third jaw intermediate between and cooperating with each of the first two jaws, a bolt passing through the jaws to draw them together, one of the jaws being screwed on the bolt and the other two jaws being loose on the bolt, the intermediate jaw being composed of two arms radial to the bolt and extending at right angles to each other.

4. A hanger comprising three jaws, a bolt screw-threaded into the intermediate jaw and passing freely through openings in the other two jaws, the intermediate jaw being composed of two arms radial to the bolt and extending at right angles to each other, and there being cooperating stops on said jaws to limit the angular movements of the outer jaws relatively to the intermediate jaws, when the jaws are engaged with each other, between positions in which they register with one arm of the intermediate jaw and positions in which they register with the other arm of the latter jaw.

5. In a hanger, a jaw in the form of two arms at right angles to each other, a second jaw overlying the first jaw and adapted to be brought into registration with either of said arms, a third jaw underlying the first jaw and adapted to be brought into registration with either of said arms, and means to secure said jaws together.

6. In a hanger, a jaw in the form of two arms at right angles to each other, a second jaw overlying the first jaw and adapted to be brought into registration with either of said arms, a third jaw underlying the first jaw and adapted to be brought into registration with either of said arms, and a bolt passing through the said second jaw at the junction of the two arms thereof and through each of the other jaws.

In testimony whereof, I sign this specification.

CARL O. AKERLUND.